United States Patent
Miyoshi et al.

(10) Patent No.: US 10,253,386 B2
(45) Date of Patent: *Apr. 9, 2019

(54) STEEL SHEET FOR HOT PRESS-FORMING, METHOD FOR MANUFACTURING THE SAME, AND METHOD FOR PRODUCING HOT PRESS-FORMED PARTS USING THE SAME

(71) Applicant: JFE STEEL CORPORATION, Chiyoda-ku, Tokyo (JP)

(72) Inventors: Tatsuya Miyoshi, Fukuyama (JP); Seiji Nakajima, Chiba (JP); Satoru Ando, Chiba (JP)

(73) Assignee: JFE Steel Corporation, Tokyo (JP)

( * ) Notice: Subject to any disclaimer, the term of this patent is extended or adjusted under 35 U.S.C. 154(b) by 66 days.

This patent is subject to a terminal disclaimer.

(21) Appl. No.: 14/382,664

(22) PCT Filed: Mar. 4, 2013

(86) PCT No.: PCT/JP2013/001294
§ 371 (c)(1),
(2) Date: Sep. 3, 2014

(87) PCT Pub. No.: WO2013/132816
PCT Pub. Date: Sep. 12, 2013

(65) Prior Publication Data
US 2015/0027596 A1   Jan. 29, 2015

(30) Foreign Application Priority Data

Mar. 7, 2012 (JP) .................................. 2012-049867

(51) Int. Cl.
| | | |
|---|---|---|
| B32B 15/00 | (2006.01) |
| C21D 8/02 | (2006.01) |
| C23C 2/02 | (2006.01) |
| C23C 2/06 | (2006.01) |
| C23C 2/28 | (2006.01) |
| C23C 2/40 | (2006.01) |
| C21D 9/46 | (2006.01) |
| C22C 18/00 | (2006.01) |
| C22C 21/10 | (2006.01) |
| C22C 38/00 | (2006.01) |
| C22C 38/60 | (2006.01) |
| C21D 1/673 | (2006.01) |
| B32B 15/01 | (2006.01) |
| C22C 38/02 | (2006.01) |
| C22C 38/04 | (2006.01) |
| C22C 38/06 | (2006.01) |
| C22C 38/18 | (2006.01) |
| C22C 38/28 | (2006.01) |
| C22C 38/32 | (2006.01) |
| B21D 22/02 | (2006.01) |
| C21D 7/13 | (2006.01) |

(52) U.S. Cl.
CPC ......... *C21D 8/0278* (2013.01); *B21D 22/022* (2013.01); *B32B 15/013* (2013.01); *C21D 1/673* (2013.01); *C21D 8/0226* (2013.01); *C21D 8/0247* (2013.01); *C21D 9/46* (2013.01); *C22C 18/00* (2013.01); *C22C 21/10* (2013.01); *C22C 38/00* (2013.01); *C22C 38/001* (2013.01); *C22C 38/02* (2013.01); *C22C 38/04* (2013.01); *C22C 38/06* (2013.01); *C22C 38/18* (2013.01); *C22C 38/28* (2013.01); *C22C 38/32* (2013.01); *C22C 38/60* (2013.01); *C23C 2/02* (2013.01); *C23C 2/06* (2013.01); *C23C 2/28* (2013.01); *C23C 2/40* (2013.01); *C21D 7/13* (2013.01); *C21D 2211/005* (2013.01); *Y10T 428/12799* (2015.01)

(58) Field of Classification Search
None
See application file for complete search history.

(56) References Cited

U.S. PATENT DOCUMENTS

| | | | |
|---|---|---|---|
| 4,610,937 A * | 9/1986 | Ito | C25D 3/565 205/227 |
| 4,707,415 A | 11/1987 | Ikeda et al. | |
| 4,775,600 A | 10/1988 | Adaniya et al. | |

(Continued)

FOREIGN PATENT DOCUMENTS

| | | |
|---|---|---|
| CA | 2806263 | 2/2012 |
| CN | 101509131 A | 8/2009 |

(Continued)

OTHER PUBLICATIONS

Extended European Search Report for European Patent Application No. 13757691.4-1353 dated Feb. 20, 2015.

(Continued)

*Primary Examiner* — Seth Dumbris
(74) *Attorney, Agent, or Firm* — RatnerPrestia

(57) ABSTRACT

The invention provides a steel sheet for hot press-forming that can reliably give hot press-formed parts having excellent paint adhesiveness, perforation corrosion resistance and joint corrosion resistance, and also provides a method for manufacturing the steel sheet for hot press-forming, and a method for producing hot press-formed parts using the steel sheet for hot press-forming. The steel sheet for hot press-forming includes a base steel sheet and a Zn-based coating layer with a mass of coating of 10 to 90 g/m$^2$ on the base steel sheet, wherein the average ferrite grain diameter in the surface microstructure of the base steel sheet is not more than 20 μm.

7 Claims, No Drawings

(56) References Cited

U.S. PATENT DOCUMENTS

| | | | | |
|---|---|---|---|---|
| 4,908,279 A | * | 3/1990 | Yusuke | C25D 5/10 |
| | | | | 428/659 |
| 5,032,236 A | | 7/1991 | Saitou et al. | |
| 5,575,899 A | * | 11/1996 | Nakakoji | C25D 3/565 |
| | | | | 205/246 |
| 6,878,462 B1 | | 4/2005 | Umino et al. | |
| 7,309,528 B2 | | 12/2007 | Clerici et al. | |
| 8,389,128 B2 | | 3/2013 | Takagi | |
| 2001/0042393 A1 | | 11/2001 | Kefferstein et al. | |
| 2004/0166360 A1 | | 8/2004 | Imai et al. | |
| 2004/0238081 A1 | | 12/2004 | Yoshinaga et al. | |
| 2005/0013722 A1 | | 1/2005 | Usami et al. | |
| 2005/0173031 A1 | * | 8/2005 | Hasegawa | C21D 8/0263 |
| | | | | 148/546 |
| 2005/0189231 A1 | * | 9/2005 | Capper | C25D 3/565 |
| | | | | 205/246 |
| 2008/0308192 A1 | | 12/2008 | Bello et al. | |
| 2009/0252641 A1 | * | 10/2009 | Hoshi | C22C 38/02 |
| | | | | 420/118 |
| 2010/0132849 A1 | * | 6/2010 | Takagi | C21D 6/005 |
| | | | | 148/533 |
| 2010/0196189 A1 | * | 8/2010 | Nakagawa | C21D 8/0426 |
| | | | | 420/114 |
| 2012/0164472 A1 | | 6/2012 | Kuhn et al. | |
| 2013/0252017 A1 | | 9/2013 | Nakajima et al. | |

FOREIGN PATENT DOCUMENTS

| | | | | |
|---|---|---|---|---|
| DE | 4019964 A1 | | 1/1991 | |
| EP | 0200007 A2 | | 11/1986 | |
| EP | 0952193 A1 | | 10/1999 | |
| EP | 1629969 A1 | | 3/2006 | |
| EP | 2138599 | | 12/2009 | |
| EP | 2233610 A1 | | 9/2010 | |
| EP | 2602359 | | 6/2013 | |
| EP | 2644751 A1 | | 10/2013 | |
| EP | 2823904 | | 1/2015 | |
| GB | 1490535 | | 11/1977 | |
| GB | 1490535 A | | 11/1977 | |
| JP | 0257697 A | | 2/1990 | |
| JP | 2001353548 | | 12/2001 | |
| JP | 2003073774 | | 3/2003 | |
| JP | 2003129209 | | 5/2003 | |
| JP | 2004250768 A | | 9/2004 | |
| JP | 2005113233 | | 4/2005 | |
| JP | 3663145 B2 | | 6/2005 | |
| JP | 2005139485 A | | 6/2005 | |
| JP | 2006265583 | * | 5/2006 | C22C 38/00 |
| JP | 2006-265583 A | | 10/2006 | |
| JP | 2007063578 | | 3/2007 | |
| JP | 2007211276 | | 8/2007 | |
| JP | 4039548 B2 | | 1/2008 | |
| JP | 2008280608 | | 11/2008 | |
| JP | 2010090462 | | 4/2010 | |
| JP | 2010090463 | | 4/2010 | |
| JP | 2010090464 | | 4/2010 | |
| JP | 2010-121181 A | | 6/2010 | |
| JP | 2010121181 | | 6/2010 | |
| JP | 2010261928 A | | 11/2010 | |
| JP | 2011000554 A | | 1/2011 | |
| JP | 2011091634 A | | 5/2011 | |
| JP | 2011162680 A | | 8/2011 | |
| JP | 2011-246801 A | | 12/2011 | |
| JP | 04883240 | | 12/2011 | |
| JP | 2012233249 A | | 11/2012 | |
| RU | 2371516 C2 | | 10/2009 | |
| WO | WO 2012/018014 A | | 2/2012 | |
| WO | WO2012018014 | * | 2/2012 | C22C 38/06 |
| WO | 2012070482 A1 | | 5/2012 | |

OTHER PUBLICATIONS

Korean Office Action dated May 11, 2016 for Korean Application No. 10-2014-7024805, including English translation, 7 pages.
International Search Report dated May 21, 2013, application No. PCT/JP2013/001294.
European Communication for European Application No. 13 757 691.4, dated Oct. 10, 2017, 4 pages.
U.S. Non-Final Office Action for U.S. Appl. No. 13/988,915, dated Jul. 25, 2017, 13 pages.
Non Final Office Action for U.S. Appl. No. 13/988,915, dated Dec. 26, 2017, 12 pages.
Non Final Office Action for U.S. Appl. No. 13/988,915, dated Mar. 30, 2017, 13 pages.
Korean Office Action for Korean Application No. 10-2015-7006438, dated Oct. 18, 2016, including Concise Statement of Relevance, 6 pages.
Canadian Office Action dated Feb. 18, 2016 for Canadian Application No, 2,817,504, 4 pages.
Chinese Office Action dated Apr. 7, 2015 in Chinese Application No. 201180055969.3, including English language translation, 10 pages.
Russian Decision to Grant for application No. 2013123693/02(034912), 6 pages.
Canadian Office Action for Application No. 2,817,504, dated Jun. 19, 2015, 4 pages.
Australian Office Action for Application No. 2011332940, dated Jun. 5, 2015, 3 pages.
Chinese Office Action dated Sep. 14, 2015 in Chinese Application No. 201180055969.3, including English language translation, 5 pages.
Extended European Search Report for European Application No. 11842845.7-1359 dated Oct. 8, 2015, 8 pages.
Canadian Office Action for Application No. 2,817,504 dated Nov. 30, 2015, 3 pages.
International Search Report for International Application No. PCT/R2011/076636 dated Dec. 20, 2011, 6 pages.
Russian Notice of Allowance dated Nov. 7, 2014, for Application No. 2013123693/02 (034912), 7 pages.

* cited by examiner

STEEL SHEET FOR HOT PRESS-FORMING, METHOD FOR MANUFACTURING THE SAME, AND METHOD FOR PRODUCING HOT PRESS-FORMED PARTS USING THE SAME

CROSS REFERENCE TO RELATED APPLICATIONS

This is the U.S. National Phase application of PCT/JP2013/001294, filed Mar. 4, 2013, which claims priority to Japanese Patent Application No. 2012-049867, filed Mar. 7, 2012, the disclosures of each of these applications being incorporated herein by reference in their entireties for all purposes.

FIELD OF THE INVENTION

The present invention relates to a steel sheet which is suited for producing automobile parts such as chassis and body structures by hot press-forming technique, a method for manufacturing the steel sheet, and a method for producing hot press-formed parts using the steel sheet.

BACKGROUND OF THE INVENTION

Many of automobile parts such as chassis and body structures are conventionally produced by press-forming steel sheets having prescribed strength at a room temperature. In recent years, the weight reduction of automobile body has been desired from the viewpoint of the preservation of global environment. Thus, there have been continuous efforts to decrease the thickness of steel sheet used for automobile parts by increasing the strength of the steel sheet. However, increasing the strength of steel sheet is accompanied by a decrease in press-formability of the steel sheet and it is frequently difficult to press-form such a steel sheet into automobile parts with desired shapes.

To remedy this difficulty, Patent Literature 1 proposes a technique in which a steel sheet that has been heated is press-formed with a mold composed of a die and a punch while being simultaneously rapidly cooled. This technique, called a hot press-forming, realizes good press-formability of a high strength steel sheet. This hot press-forming, however, involves heating of a steel sheet to a high temperature of about 950° C. before the press-forming. As a result, scales (iron oxide) are formed on the surface of the steel sheet. Such scales are peeled off during the hot press-forming to damage the mold or damage the surface of hot press-formed parts. Further, scales remaining on the surface of parts deteriorate the appearance or decrease the paint adhesiveness. Thus, the surface of such parts is usually descaled by treatments such as pickling or shot blasting. However, the implementation of these treatments makes the manufacturing steps complicated and decreases the productivity. Such automobile parts as chassis and body structures require excellent corrosion resistance, but the hot press-formed parts manufactured through the above treatments show significantly insufficient corrosion resistance due to the fact that they are not provided with an anticorrosion film such as a coating layer.

Thus, there has been a demand for a hot press-forming technique which can suppress the formation of scales during heating before hot press-forming and also can increase the corrosion resistance of hot press-formed parts. This has led to proposals of steel sheets having a film such as a coating layer on the surface, and hot press-forming methods using such steel sheets. For example, Patent Literature 2 discloses a method for manufacturing a hot press-formed part with excellent corrosion resistance in which a steel sheet coated with Zn or Zn-based alloy is hot press-formed so that Zn—Fe-based compound or Zn—Fe—Al-based compound is formed on the surface of the part. Patent Literature 3 discloses a hot press-formed article (part) with excellent formability, weldability and corrosion resistance that is obtained by heating a galvannealed steel sheet at 700 to 1000° C. for 2 to 20 minutes and hot press-forming the steel sheet to form a coating layer containing Fe—Zn solid solution phase on the surface of the article.

PATENT LITERATURE

PTL 1: United Kingdom Patent No. 1490535
PTL 2: Japanese Patent No. 3663145
PTL 3: Japanese Patent No. 4039548

SUMMARY OF THE INVENTION

The hot press-formed part manufactured by the method described in Patent Literature 2 and the hot press-formed part described in Patent Literature 3 often show low paint adhesiveness or exhibit low resistance to perforation corrosion which is prone to occur at portions where chemical conversion films or electrodeposited films are not fully formed (hereinafter, perforation corrosion resistance) and low resistance to corrosion at joints between stacked steel sheets (hereinafter, joint corrosion resistance).

It is an object of the invention to provide a steel sheet for hot press-forming that can give with high reliability hot press-formed parts having excellent paint adhesiveness, perforation corrosion resistance and joint corrosion resistance, and also to provide a method for manufacturing the steel sheet, and a method for producing hot press-formed parts using the steel sheet.

The present inventors carried out extensive studies with respect to the above target steel sheet for hot press-forming. As a result, the present inventors have obtained the following findings.

i) The hot press-formed part according to Patent Literatures 2 and 3 shows low paint adhesiveness, perforation corrosion resistance and joint corrosion resistance because voids are formed at the interface between ZnO formed during heating before hot press-forming and the steel sheet or the Zn-based coating layer.

ii) The formation of such voids is effectively prevented by controlling the average ferrite grain diameter in the surface microstructure of the base steel sheet, which is under the coating layer, to 20 μm or less.

The present invention has been made based on these findings. The invention provides a steel sheet for hot press-forming including a base steel sheet and a Zn-based coating layer with a mass of coating of 10 to 90 g/m² on the base steel sheet, wherein the average ferrite grain diameter in the surface microstructure of the base steel sheet is not more than 20 μm.

In the steel sheet for hot press-forming of the invention, it is preferable that the Zn-based coating layer has a chemical composition consisting of 10 to 25 mass % Ni and the balance being Zn and inevitable impurities.

In the steel sheet for hot press-forming of the invention, it is preferable that the Zn-based coating layer includes an η phase in an amount of not more than 5 mass %, and more preferably not more than 2 mass %.

The base steel sheet under the Zn-based coating layer may be a steel sheet having a chemical composition consisting of, by mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and the balance being Fe and inevitable impurities.

Preferably, the base steel sheet further includes, by mass %, at least one selected from Cr: 0.01 to 1%, Ti: not more than 0.2% and B: 0.0005 to 0.08%, and/or Sb: 0.003 to 0.03%.

The steel sheet for hot press-forming of the invention may be manufactured by heating a steel sheet having the aforementioned chemical composition at 760 to 840° C. and forming a Zn-based coating layer with a mass of coating of 10 to 90 g/m$^2$.

The invention also provides a method for producing hot press-formed parts including heating the aforementioned steel sheet for hot press-forming to a temperature in the range of $Ac_3$ transformation point to 1000° C., and hot press-forming the heated steel sheet.

The present invention allows for the manufacturing of a steel sheet for hot press-forming which can give with high reliability hot press-formed parts having excellent paint adhesiveness, perforation corrosion resistance and joint corrosion resistance. Hot press-formed parts produced by the hot press-formed part production method of the invention with use of the inventive steel sheet for hot press-forming have good appearance and are suited for automobile chassis and body structures.

DETAILED DESCRIPTION OF EMBODIMENTS OF THE INVENTION

1) Steel Sheet for Hot Press-Forming 1-1) Zn-Based Coating Layer

In the invention, a Zn-based coating layer is disposed on the surface of a steel sheet with a mass of coating of 10 to 90 g/m$^2$ in order to suppress the formation of scales during heating before hot press-forming. Here, the mass of the coating layer (per surface of the steel sheet) is limited to 10 to 90 g/m$^2$ because the sacrificial anticorrosion effect of zinc cannot be fully obtained if the mass is less than 10 g/m$^2$ and also because the effect is saturated and the cost is increased if the mass exceeds 90 g/m$^2$.

Examples of the Zn-based coating layer include a pure Zn coating layer (for example, a coating layer formed in an electrogalvanizing line or a hot dip galvanizing line), a Zn—Ni alloy coating layer, a Zn—Fe alloy coating layer (a coating layer alloyed in a hot dip galvanizing line), a Zn—Cr alloy coating layer, a Zn—Mn alloy coating layer, a Zn—Co alloy coating layer, a Zn—Cr—Ni alloy coating layer, a Zn—Cr—Fe alloy coating layer, a Zn—Cr—Co alloy coating layer, a Zn—Al alloy coating layer (for example, a Zn-5% Al coating layers or a Zn-55% Al coating layer), a Zn—Mg alloy coating layer and a Zn—Al—Mg alloy coating layer (for example, a Zn-6% Al-3% Mg coating layer or a Zn-11% Al-3% Mg coating layer). The Zn-based coating layer may be a Zn-based composite coating layer in which metal oxides or polymers are dispersed (for example, a Zn—SiO$_2$-dispersed coating layer). Further, a plurality of the Zn-based coating layers may be stacked on top of one another.

In particular, a Zn—Ni alloy coating layer having a Ni content of 10 to 25 mass % is preferable. Because such a Zn—Ni alloy includes a γ phase which has a crystal structure of Ni$_2$Zn$_{11}$, NiZn$_3$ or Ni$_5$Zn$_{21}$ and a high melting point of 881° C., the formation of scales and ZnO during heating before hot press-forming may be advantageously suppressed to minimum. Further, the high melting point decreases the speed at which coating components are diffused into ferrite grains of the steel sheet during hot press-forming. That is, the loss of the coating layer is small and thus the deterioration in corrosion resistance is limited. No Zn—Fe metal compounds are formed during heating, and consequently the formation of scales associated with the occurrence of cracks is suppressed. Furthermore, the coating layer remains in the form of γ phase even after the completion of hot press-forming and thus excellent corrosion resistance is achieved by the sacrificial anticorrosion effect of zinc. The formation of γ phase with a Ni content of 10 to 25 mass % is not necessarily consistent with the equilibrium diagram of the Ni—Zn alloy. This inconsistency probably arises because the coating reaction by such a method as electrocoating does not take place in equilibrium. The γ phase of Ni$_2$Zn$_{11}$, NiZn$_3$ or Ni$_5$Zn$_{21}$ may be identified by an X-ray diffraction method or an electron diffraction method using TEM (transmission electron microscopy). As mentioned above, controlling the Ni content in the coating layer to 10 to 25 mass % ensures that the γ phase will be formed. However, the coating layer may contain a slight amount of η phase in addition to the γ phase depending on, for example, the electrocoating conditions. In such a case, the amount of η phase is preferably not more than 5 mass % in order to minimally suppress the ZnO formation reaction during heating. More preferably, the amount of η phase is not more than 2 mass %. Controlling the amount to not more than 2 mass % suppresses the ZnO formation and can also prevent the coating from being attached to the mold during hot press-forming. Consequently, it is possible to reduce the occurrence of reattachment of the coating to the workpiece during continuous hot press-forming and also to reduce the frequency of mold maintenance. The amount of η phase is defined as a weight ratio of η phase to total coating layer, and may be determined by, for example, an anodic dissolution method.

The coating layer may be formed by any method without limitation. Examples of the coating layer forming method include a known electrolytic method (electrolysis in aqueous solution or non-aqueous solution), a hot dip method or a gas phase method.

1-2) Chemical Composition of Base Steel Sheet

In order to obtain a hot press-formed part having a strength of not less than 980 MPa, the base steel sheet under the coating layer may be, for example, a hot-rolled steel sheet or a cold-rolled steel sheet that have a chemical composition comprising, by mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and the balance being Fe and inevitable impurities. The reasons why the contents of these elements are limited will be described hereinbelow. Here, the unit "%" for the content of element indicates "mass %" unless otherwise mentioned.

C: 0.15 to 0.5%

Carbon is an element that increases the strength of steel. In order for the hot press-formed part to achieve a tensile strength (TS) of not less than 980 MPa, the C content is to be not less than 0.15%. On the other hand, any C content exceeding 0.5% causes a marked decrease in blanking workability of base steel sheet. Thus, the C content is limited to 0.15 to 0.5%.

Si: 0.05 to 2.0%

Similarly to carbon, silicon is an element that increases the strength of steel. In order for the hot press-formed part to achieve a TS of not less than 980 MPa, the Si content is to be not less than 0.05%. On the other hand, any Si content exceeding 2.0% leads to a marked increase in occurrence of surface defects called red scales during hot-rolling, and causes an increase in rolling load and a deterioration in ductility of hot-rolled steel sheet. Further, the presence of silicon in an amount exceeding 2.0% may adversely affect coating properties when the surface of steel sheet is coated with a coating film based on zinc or aluminum. Thus, the Si content is limited to 0.05 to 2.0%.

Mn: 0.5 to 3%

Manganese is an effective element for improving the hardenability of steel by suppressing the ferrite transformation. Further, manganese decreases the $Ac_3$ transformation point and is thus also effective for reducing the temperature of heating before hot press-forming. In order to obtain these effects, the Mn content is to be not less than 0.5%. If, on the other hand, the Mn content exceeds 3%, manganese is segregated to lower the uniformity of characteristics of base steel sheet and hot press-formed part. Thus, the Mn content is limited to 0.5 to 3%.

P: not more than 0.1%

If the P content exceeds 0.1%, phosphorus is segregated to lower the uniformity of characteristics of steel sheet and hot press-formed part and also to cause a marked decrease in toughness. Thus, the P content is limited to not more than 0.1%.

S: not more than 0.05%

If the S content exceeds 0.05%, the toughness of hot press-formed part is lowered. Thus, the S content is limited to not more than 0.05%.

Al: not more than 0.1%

If the Al content exceeds 0.1%, the blanking workability and the hardenability of base steel sheet are lowered. Thus, the Al content is limited to not more than 0.1%.

N: not more than 0.01%

If the N content exceeds 0.01%, the nitrides AlN are formed during hot-rolling or heating before hot press-forming and consequently the blanking workability and the hardenability of base steel sheet are lowered. Thus, the N content is limited to not more than 0.01%.

The balance is iron and inevitable impurities. For the reasons described below, the balance preferably includes at least one selected from Cr: 0.01 to 1%, Ti: not more than 0.2% and B: 0.0005 to 0.08%, and/or Sb: 0.003 to 0.03%.

Cr: 0.01 to 1%

Chromium is an effective element for increasing the strength of steel and also for improving hardenability. In order to obtain these effects, the Cr content is preferably 0.01% or more. On the other hand, a significant increase in cost is avoided as long as the Cr content is not more than 1%. Thus, the upper limit is preferably 1%.

Ti: not more than 0.2%

Titanium is an effective element that strengthens steel and improves toughness of steel by reducing its grain size. Further, titanium is nitrided in preference to boron described below and thus effectively allows solute boron to improve hardenability. In order to obtain these effects, the Ti content is preferably 0.02% or more. As long as the Ti content is not more than 0.2%, hot-rolling does not incur a significant increase in rolling load and the toughness of hot press-formed part is not decreased. Thus, the upper limit is preferably 0.2%.

B: 0.0005 to 0.08%

Boron is an effective element for improving hardenability during hot press-forming and also for improving toughness after hot press-forming. In order to obtain these effects, the B content is preferably not less than 0.0005%. On the other hand, 0.08% or less boron ensures that hot-rolling does not incur a significant increase in rolling load and also that a martensite phase or a bainite phase is not formed after hot-rolling and the steel sheet is prevented from problems such as the occurrence of cracks. Thus, the upper limit is preferably 0.08%.

Sb: 0.003 to 0.03%

Antimony has an effect of suppressing the formation of decarburized layer in the surface portion of steel sheet during hot press-forming process from heating before hot press-forming to cooling after hot press-forming. In order to obtain this effect, the Sb content is preferably not less than 0.003%. As long as the Sb content is not more than 0.03%, an increase in rolling load is not caused and productivity is not deteriorated. Thus, the Sb content is preferably limited to 0.003 to 0.03%.

1-3) Microstructure of Base Steel Sheet

As mentioned hereinabove, the hot press-formed part coated with a Zn-based coating layer shows low paint adhesiveness, perforation corrosion resistance and joint corrosion resistance because of voids occurring at the interface between ZnO formed during heating before hot press-forming and the steel sheet or the Zn-based coating layer. The formation of such voids is effectively prevented by controlling the average ferrite grain diameter in the surface microstructure of the base steel sheet to 20 μm or less. By controlling the ferrite grain diameter to 20 μm or less, the intra granular diffusion of coating components is allowed to occur in the entire region inside the ferrite grain during heating with the result that the remaining amount of the coating layer is decreased substantially uniformly. Probably because of this, few voids occur between ZnO formed on the surface of the coating layer, and the steel sheet or the coating layer. The average ferrite grain diameter is measured in the following manner. A polished sectional sample is prepared by polishing a thickness cross section of steel sheet perpendicular to the rolling direction, and the surface portion of steel sheet in the polished section is micro graphed with 400× magnification. The obtained image is processed by a linear intercept method in accordance with JIS G 0552 to count the number of ferrite grains near the surface of steel sheet that are intersected by any straight line extending in a direction perpendicular to the thickness direction of steel sheet, the results being averaged.

If the average ferrite grain diameter exceeds 20 μm, the intra granular diffusion of coating components into the ferrite grain does not proceed and the diffusion stops near the interface between the ferrite grain and the coating layer. Heating at an elevated temperature melts the remaining coating layer and the coating layer is aggregated to become non-uniform. As a result, ZnO formed on the surface of such a coating layer becomes non-uniform too and an increased number of voids are disadvantageously formed between the ZnO and the steel sheet or the coating layer.

The diameter of ferrite grain in the surface microstructure of the base steel sheet, namely, at the interface between the coating layer and the steel sheet is controlled to 20 μm or less. Advantageously, this control is performed in combination with the use of a Zn—Ni alloy coating having a high melting point (comprising 10 to 25 mass % Ni and the balance being Zn and inevitable impurities). Such combined control highly effectively suppresses the formation of ZnO associated with the melting of the coating layer at a high temperature during hot press-forming and allows the coating layer to remain intact. Further, the combined control is highly effective in allowing the intra granular diffusion of coating components into the ferrite grain to take place substantially uniformly. Thus, further improvement in paint adhesiveness, perforation corrosion resistance and joint corrosion resistance is realized by the combined control in which the diameter of ferrite grain in the surface microstructure of the base steel sheet, that is, at the interface between the coating layer and the steel sheet is controlled to 20 μm or less and a Zn—Ni alloy coating having a high melting point (comprising 10 to 25 mass % Ni and the balance being Zn and inevitable impurities) is used.

As mentioned hereinabove, the surface of steel sheet indicates an interface between the coating layer and the base steel sheet, namely, a superficial portion of the base steel sheet that is in contact with the coating layer.

The average diameter of ferrite grain in the surface microstructure of the base steel sheet may be controlled to 20 μm or less by heating a steel sheet having the aforementioned chemical composition at 760 to 840° C. before the formation of the Zn-based coating layer.

2) Method for Producing Hot Press-Formed Part

The inventive steel sheet for hot press-forming described above is preferably heated to a temperature in the range of the $Ac_3$ transformation point to 1000° C. and are thereafter hot press-formed into a hot press-formed part. The steel sheet is heated to the $Ac_3$ transformation point or above before hot press-forming in order that hard phases such as a martensite phase are formed by rapid cooling during hot press-forming and thereby the hot press-formed part attains a high strength. The upper limit of the heating temperature is limited to 1000° C. because heavy ZnO is formed on the surface of the coating layer at above 1000° C. As used herein, the term "heating temperature" indicates the maximum steel sheet temperature that is reached during heating.

The average heating rate during the heating before hot press-forming is not particularly limited but is preferably, for example, 2 to 200° C./s. The amount of ZnO formed on the surface of the coating layer, the number of voids formed between ZnO and the steel sheet or the coating layer, and the amount of scales formed locally at defects in the coating layer are increased with increasing time for which the steel sheet is held at a high temperature. Thus, a higher average heating rate is more preferable. The time of holding at the maximum steel sheet temperature is not particularly limited. However, the holding time is advantageously short for the same reason as described above, and is preferably not more than 300 seconds, more preferably not more than 120 seconds, and still more preferably not more than 10 seconds.

Examples of the heating method before hot press-forming include heating with electric furnace, gas furnace or the like, flame heating, conductive heating, high-frequency heating and inductive heating.

EXAMPLES

A cold-rolled steel sheet with a thickness of 1.6 mm was used as a base steel sheet. The steel sheet has a $Ac_3$ transformation point of 820° C. and a chemical composition comprising, by mass %, C: 0.23%, Si: 0.25%, Mn: 1.2%, P: 0.01%, S: 0.01%, Al: 0.03%, N: 0.005%, Cr: 0.2%, Ti: 0.02%, B: 0.0022%, Sb: 0.008%, and the balance being Fe and inevitable impurities. The cold-rolled steel sheet was annealed at various temperatures. Thus, the cold-rolled steel sheets with various average ferrite grain diameters in the surface microstructure of base steel sheet were obtained.

The surface of the cold-rolled steel sheets was coated by an electrocoating method or a hot dip coating method, thereby preparing the coated steel sheets Nos. 1 to 32. The coating type, the coating mass, and the Ni content of the coating layer of the coated steel sheets are described in Table 1.

The coated steel sheets Nos. 1 to 32 obtained above were subjected to simulated hot press-forming in which the coated steel sheets were heated with an electric furnace or by direct energization under heating conditions described in Table 1 and were thereafter sandwiched between Al molds and cooled at a cooling rate of 50° C./s.

The cold-rolled steel sheets before the coating treatment were studied by the following method to determine the average ferrite grain diameter in the surface microstructure of the base steel sheet. Also, the coated steel sheets after the simulated hot press-forming were studied by the following methods to evaluate the paint adhesiveness, the perforation corrosion resistance, the joint corrosion resistance and the anti mold contamination properties.

Average ferrite grain diameter: A thickness cross section of the cold-rolled steel sheet before the coating treatment was polished and etched with Nital. Three fields of view of a superficial portion were micrographed (400× magnification). The image of each field of view was analyzed and the diameter of ferrite grain at the superficial surface were measured by a linear intercept method in accordance with JIS G 0552. The average of the three fields of view was obtained as an average ferrite grain size.

Paint adhesiveness: A sample (70 mm×150 mm) was obtained from the coated steel sheet after the simulated hot press-forming and was subjected to a chemical conversion treatment under standard conditions using PB-SX35 manufactured by Nihon Parkerizing Co., Ltd. Thereafter, electrodeposition paint GT-10HT Gray manufactured by Kansai Paint Co., Ltd. was deposited and baked at 170° C. for 20 minutes to form a film with a film thickness of 20 μm, thereby producing a painted test piece. The painted test piece was immersed in distilled water at 40° C. for 10 days and immediately thereafter the chemically treated and electrodeposition painted surface was cut with a cutter knife to a depth reaching the base steel sheet so as to form a lattice pattern (10×10 squares with 1 mm intervals). An adhesive tape was applied to and peeled from the lattice pattern. The results of this cross-cut adhesion test were evaluated on the basis of the following criteria. The symbols ⊙ and ○ indicate excellent paint adhesiveness.

⊙: No squares were peeled off.
○: 1 to 10 squares were peeled off.
Δ: 11 to 30 squares were peeled off.
x: 31 or more squares were peeled off.

Perforation corrosion resistance: A sample (70 mm×150 mm) was obtained from the coated steel sheet after the simulated hot press-forming. Non-evaluated surfaces and ends of the sample were sealed with a tape. The sample was then subjected to a composite corrosion test that included 150 cycles of salt spraying (a 5 mass % aqueous NaCl solution, 35° C., 2 h)→drying (60° C., relative humidity 20 to 30%, 4 h)→wetting (50° C., relative humidity 95%, 2 h). The rust and the coating layer were removed with hydrochloric acid. Thereafter, the sheet thicknesses Tn (n=1 to 10) were measured with a micrometer with respect to ten sites where the corrosion was marked. Separately, the average sheet thickness $T_0$ of sealed and thus uncorroded five locations was measured. The largest value obtained by ($T_0$–Tn), namely, the maximum thickness reduction was determined and evaluated based on the following criteria. The object of the invention is satisfied when the evaluation is ⊙, ○ or Δ.

⊙: Maximum thickness reduction≤0.1 mm
◯: 0.1 mm<Maximum thickness reduction≤0.2 mm
Δ: 0.2 mm<Maximum thickness reduction≤0.3 mm
x: 0.3 mm<Maximum thickness reduction Joint corrosion resistance: A larger sample (70 mm×150 mm) and a smaller sample (40 mm×110 mm) were obtained from the coated steel sheet after the simulated hot press-forming. The smaller sample was placed (stacked) in the middle of the larger sample, and these were joined together by welding. The resultant sample was subjected to a chemical conversion treatment under standard conditions using PB-SX35 manufactured by Nihon Parkerizing Co., Ltd. Thereafter, electrodeposition paint GT-10HT Gray manufactured by Kansai Paint Co., Ltd. was deposited and baked at 170° C. for 20 minutes to form a film with a film thickness of 20 μm, thereby producing a joint test piece. Non-evaluated surfaces of the joint test piece were sealed with a tape. The sample was then subjected to a composite corrosion test that included 150 cycles of salt spraying (a 5 mass % aqueous NaCl solution, 35° C., 2 h)→drying (60° C., relative humidity 20 to 30%, 4 h)→wetting (50° C., relative humidity 95%, 2 h). The welded portion of the tested sample was drilled and the sample was disassembled. The maximum corrosion depth in the joint was measured and evaluated based on the following criteria. The object of the invention is satisfied when the evaluation is ⊙, ◯ or Δ.

⊙: Maximum corrosion depth≤0.1 mm
◯: 0.1 mm<Maximum corrosion depth≤0.2 mm
Δ: 0.2 mm<Maximum corrosion depth≤0.4 mm
x: 0.4 mm<Maximum corrosion depth Anti mold contamination properties: The attachment of coating components to the molds during hot press-forming was evaluated. A sample (50×500 mm) obtained from the coated steel sheet before hot press-forming was heated at a furnace temperature of 890° C. and was sandwiched between the molds when the sheet temperature was 700° C. The sample was then slid at 50 mm/s, and the attachment of coating components to the molds was visually observed.

The contamination was visually evaluated based on the following criteria. The anti mold contamination properties were evaluated as good when the evaluation was ⊙ or ◯.
⊙: The coating layer was not attached.
◯: The coating layer was slightly attached.
Δ: The coating layer was clearly attached.
x: The coating layer was heavily attached.

The results are described in Table 1. In Inventive Examples, all the coated steel sheets were demonstrated to have excellent paint adhesiveness, perforation corrosion resistance, joint corrosion resistance and anti mold contamination properties.

TABLE 1

| Coated steel sheet No. | Steel sheet Annealing temp. (°C) | Steel sheet Average ferrite diameter (μm) | Coating layer Coating type* | Coating layer Coating mass (g/m²) | Coating layer Ni content (mass %) | Coating layer η phase content (mass %) | Heating conditions Average heating rate (°C/s) | Heating conditions Heating temp. (°C) | Heating conditions Holding time (s) | Heating conditions Cooling rate (°C/s) | Paint adhesiveness | Perforation corrosion resistance | Joint corrosion resistance | Anti mold contamination properties | Remarks |
|---|---|---|---|---|---|---|---|---|---|---|---|---|---|---|---|
| 1 | 790 | 17 | EG | 50 | — | — | 20 | 900 | 0 | 50 | ○ | △ | △ | X | Inv. Ex. |
| 2 | 790 | 17 | GI | 60 | — | — | 20 | 900 | 0 | 50 | ○ | △ | ○ | X | Inv. Ex. |
| 3 | 790 | 17 | GA | 45 | — | — | 20 | 900 | 0 | 50 | ◎ | △ | △ | ○ | Inv. Ex. |
| 4 | 790 | 17 | ZN | 40 | 12 | 3.6 | 20 | 900 | 0 | 50 | ◎ | ○ | ○ | △ | Inv. Ex. |
| 5 | 790 | 17 | GL | 90 | — | — | 20 | 900 | 0 | 50 | ○ | ○ | △ | △ | Inv. Ex. |
| 6 | 790 | 17 | ZM1 | 90 | — | — | 20 | 900 | 0 | 50 | ○ | ○ | ○ | △ | Inv. Ex. |
| 7 | 790 | 17 | ZM2 | 90 | — | — | 20 | 900 | 0 | 50 | ◎ | ○ | ○ | △ | Inv. Ex. |
| 8 | 780 | 14 | ZN | 40 | 12 | 3.6 | 20 | 900 | 0 | 50 | ◎ | ○ | ○ | ○ | Inv. Ex. |
| 9 | 770 | 11 | ZN | 40 | 12 | 3.6 | 20 | 900 | 0 | 50 | ○ | ○ | ○ | ○ | Inv. Ex. |
| 10 | 800 | 20 | ZN | 40 | 12 | 3.6 | 20 | 900 | 0 | 50 | △ | △ | △ | ○ | Comp. Ex. |
| 11 | 850 | 28 | ZN | 40 | 12 | 3.6 | 20 | 900 | 0 | 50 | X | X | X | ○ | Comp. Ex. |
| 12 | 865 | 45 | ZN | 40 | 12 | 3.6 | 20 | 900 | 0 | 50 | ○ | ○ | ○ | ○ | Inv. Ex. |
| 13 | 790 | 17 | ZN | 40 | 10 | 3.2 | 20 | 900 | 0 | 50 | ◎ | ○ | ○ | ○ | Inv. Ex. |
| 14 | 790 | 17 | ZN | 40 | 18 | 2.7 | 20 | 900 | 0 | 50 | ◎ | ○ | ○ | ◎ | Inv. Ex. |
| 15 | 790 | 17 | ZN | 40 | 26 | 1.8 | 20 | 900 | 0 | 50 | ○ | ○ | △ | ○ | Inv. Ex. |
| 16 | 790 | 17 | ZN | 10 | 12 | 2.1 | 20 | 900 | 0 | 50 | ◎ | △ | ○ | ○ | Inv. Ex. |
| 17 | 790 | 17 | ZN | 60 | 12 | 4.0 | 20 | 900 | 0 | 50 | ◎ | ◎ | ◎ | ◎ | Inv. Ex. |
| 18 | 790 | 17 | ZN | 90 | 12 | 4.8 | 20 | 900 | 0 | 50 | ◎ | ◎ | ◎ | ○ | Inv. Ex. |
| 19 | 790 | 17 | ZN | 40 | 12 | 6.4 | 20 | 900 | 0 | 50 | ◎ | △ | △ | ○ | Inv. Ex. |
| 20 | 790 | 17 | ZN | 40 | 12 | 2.0 | 20 | 900 | 0 | 50 | ◎ | ◎ | ◎ | ◎ | Inv. Ex. |
| 21 | 790 | 17 | ZN | 40 | 12 | 0.7 | 20 | 900 | 0 | 50 | ◎ | ○ | ○ | ○ | Inv. Ex. |
| 22 | 790 | 17 | ZN | 40 | 12 | 3.6 | 50 | 900 | 0 | 50 | ◎ | ◎ | ◎ | ○ | Inv. Ex. |
| 23 | 790 | 17 | ZN | 40 | 12 | 3.6 | 100 | 900 | 0 | 50 | ◎ | ◎ | ◎ | ◎ | Inv. Ex. |
| 24 | 790 | 17 | ZN | 40 | 12 | 3.6 | 20 | 850 | 0 | 50 | ○ | ○ | ○ | ○ | Inv. Ex. |
| 25 | 790 | 17 | ZN | 40 | 12 | 3.6 | 20 | 950 | 0 | 50 | ◎ | ○ | ○ | ○ | Inv. Ex. |
| 26 | 790 | 17 | ZN | 40 | 12 | 3.6 | 20 | 1000 | 0 | 50 | ○ | △ | △ | ○ | Inv. Ex. |
| 27 | 790 | 17 | ZN | 40 | 12 | 3.6 | 20 | 900 | 300 | 50 | ◎ | ◎ | ◎ | ○ | Inv. Ex. |
| 28 | 790 | 17 | ZN | 40 | 12 | 3.6 | 20 | 900 | 0 | 20 | ○ | ○ | ○ | ○ | Inv. Ex. |
| 29 | 790 | 17 | ZN | 40 | 9 | 3.1 | 20 | 900 | 0 | 50 | ◎ | ◎ | ○ | ○ | Inv. Ex. |
| 30 | 790 | 17 | ZN | 40 | 26 | 2.2 | 20 | 900 | 0 | 50 | ◎ | ◎ | ◎ | ◎ | Inv. Ex. |
| 31 | 790 | 17 | ZN | 9 | 12 | 1.4 | 20 | 900 | 0 | 50 | △ | X | X | ◎ | Comp. Ex. |
| 32 | 790 | 17 | — | — | — | — | 20 | 900 | 0 | 50 | X | X | X | ◎ | Comp. Ex. |

*EG: electrogalvanizing
GI: hot dip galvanizing
GA: galvannealing (Fe content: 10 mass %)
ZN: electro Zn—Ni alloy coating (Ni content: described in table)
GL: hot dip Zn—Al alloy coating (Al content: 56 mass %)
ZM1: hot dip Zn—Al—Mg alloy coating (Al content: 5 mass %, Mg content: 0.5 mass %)
ZM2: hot dip Zn—Al—Mg alloy coating (Al content: 6 mass %, Mg content: 3 mass %)

Although hot press-forming was not actually performed in this example, the results in this example allow the paint adhesiveness, the perforation corrosion resistance, the joint corrosion resistance and the anti mold contamination properties of hot press-formed part to be evaluated because the paint adhesiveness, the perforation corrosion resistance, the joint corrosion resistance and the anti mold contamination properties are affected by changes that occur in the coating layer by heating before hot press-forming.

The invention claimed is:

1. A steel sheet for hot press-forming comprising a base steel sheet and a Zn-based coating layer formed directly on a surface of the base steel sheet, wherein the base steel sheet has a chemical composition comprising, by mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, Sb: 0.003 to 0.03%, and the balance being Fe and inevitable impurities, wherein the Zn-based coating layer has a mass of coating of 10 to 90 g/m² on the base steel sheet, has a chemical composition comprising 10 to 25 mass % Ni and the balance being Zn and inevitable impurities, and is the uppermost layer of the steel sheet, wherein the average ferrite grain diameter in the surface microstructure of the base steel sheet is not more than 20 μm, and wherein the Zn-based coating layer includes an η phase in an amount of not more than 5 mass %.

2. The steel sheet for hot press-forming according to claim 1, wherein the base steel sheet under the Zn-based coating layer further includes, by mass %, at least one selected from Cr: 0.01 to 1%, Ti: not more than 0.2% and B: 0.0005 to 0.08%.

3. A method for producing hot press-formed parts, comprising heating the steel sheet for hot press-forming described in claim 2 to a temperature in the range of Ac3 transformation point to 1000° C., and hot press-forming the heated steel sheet.

4. A steel sheet for hot press-forming comprising a base steel sheet and a Zn-based coating layer formed directly on a surface of the base steel sheet, wherein the base steel sheet has a chemical composition comprising, by mass %, C: 0.23 to 0.5%, Si: 0.05 to 2.0%, Mn: 0.5 to 3%, P: not more than 0.1%, S: not more than 0.05%, Al: not more than 0.1%, N: not more than 0.01%, Sb: 0.003 to 0.03%, and the balance being Fe and inevitable impurities, wherein the Zn-based coating layer has a mass of coating of 10 to 90 g/m² on the base steel sheet and has a chemical composition comprising 10 to 25 mass % Ni and the balance being Zn and inevitable impurities, and wherein the average ferrite grain diameter in the surface microstructure of the base steel sheet is not more than 20 μm.

5. A method for producing hot press-formed parts, comprising heating the steel sheet for hot press-forming described in claim 1 to a temperature in the range of Ac3 transformation point to 1000° C., and hot press-forming the heated steel sheet.

6. A method for manufacturing the steel sheet for hot press-forming of claim 1, comprising heating the base steel sheet at 760 to 840° C., the base steel sheet having the chemical composition comprising, by mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, Sb: 0.003 to 0.03%, and the balance being Fe and inevitable impurities, and forming the Zn-based coating layer directly on the surface of the base steel sheet with the mass of coating of 10 to 90 g/m².

7. A method for manufacturing the steel sheet for hot press-forming of claim 2, comprising heating the base steel sheet at 760 to 840° C., the base steel sheet having the chemical composition comprising, by mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, Sb: 0.003 to 0.03%, at least one selected from Cr: 0.01 to 1%, Ti: not more than 0.2% and B: 0.0005 to 0.08%, and the balance being Fe and inevitable impurities, and forming the Zn-based coating layer directly on the surface of the base steel sheet with the mass of coating of 10 to 90 g/m².

* * * * *